United States Patent
Wang et al.

(10) Patent No.: US 6,456,492 B1
(45) Date of Patent: Sep. 24, 2002

(54) EXPANSION APPARATUS FOR A PORTABLE COMPUTER

(75) Inventors: Juei-Chi Wang, Taipei (TW); Tsang-Lung Lin, Taipei (TW); Ching-Sung Yeh, Taipei (TW); Chen-Lun Sun, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 09/393,989

(22) Filed: Sep. 10, 1999

(30) Foreign Application Priority Data

Jul. 9, 1999 (TW) ..................... 88211492 U

(51) Int. Cl.⁷ ............................. H05K 5/02; H05K 7/10
(52) U.S. Cl. ....................... 361/686; 361/683; 361/727; 312/223.2; 710/303
(58) Field of Search ................................. 361/686, 727, 361/683; 70/57.1, 58, 59; 312/223.1, 223.2, 223.3; 710/300–304

(56) References Cited

U.S. PATENT DOCUMENTS

| | | | | |
|---|---|---|---|---|
| 4,769,764 A | * | 9/1988 | Levanon | 364/708 |
| 5,107,400 A | | 4/1992 | Kobayahsi | |
| 5,126,954 A | | 6/1992 | Morita | |
| 5,159,533 A | | 10/1992 | Kuang | |
| 5,175,671 A | | 12/1992 | Sasaki | |
| 5,187,645 A | * | 2/1993 | Spalding et al. | 361/393 |
| 5,227,957 A | * | 7/1993 | Deters | 361/395 |
| 5,323,291 A | | 6/1994 | Boyle et al. | |
| 5,331,509 A | * | 7/1994 | Kikinis | 361/686 |
| 5,394,552 A | | 2/1995 | Shirota | |
| 5,430,883 A | * | 7/1995 | Horiuchi | 395/750 |
| 5,435,737 A | * | 7/1995 | Haga et al. | 439/157 |
| 5,440,748 A | * | 8/1995 | Sekine et al. | 395/750 |
| 5,477,415 A | * | 12/1995 | Mitcham et al. | 361/686 |
| 5,488,572 A | * | 1/1996 | Belmont | 364/514 R |
| 5,526,493 A | | 6/1996 | Shu | |
| 5,544,009 A | * | 8/1996 | Hosoya et al. | 361/684 |
| 5,602,721 A | * | 2/1997 | Slade et al. | 361/727 |
| 5,604,662 A | * | 2/1997 | Anderson et al. | 361/685 |
| 5,627,728 A | * | 5/1997 | Ma et al. | 361/686 |
| 5,694,292 A | * | 12/1997 | Paulsel et al. | 361/686 |
| 5,737,189 A | * | 4/1998 | Kammersgard et al. | 361/726 |
| 5,761,032 A | * | 6/1998 | Jones | 361/685 |
| 5,822,184 A | * | 10/1998 | Rabinovitz | 361/685 |
| 5,864,294 A | | 1/1999 | Hsu et al. | |
| 5,913,926 A | * | 6/1999 | Anderson et al. | 714/6 |

\* cited by examiner

Primary Examiner—Anatoly Vortman
(74) Attorney, Agent, or Firm—Rabin & Berdo, P.C.

(57) ABSTRACT

An external expansion apparatus for a portable computer is provided. The expansion apparatus is detachably connected via a cable to the portable computer for providing functional expansion for the portable computer when connected to the portable computer. The expansion apparatus includes a box body having a plurality of accommodating rooms. Each of the plurality of the rooms is for accommodating one of detachable expansion units of different types. The expansion apparatus also includes a communication control circuit for controlling the communication between the portable computer. In particular, because each of the plurality of expansion units is formed a module, the expansion apparatus can provides users with multiple choices and a great degree of convenience for the functional expansion of the portable computer. In the invention, one of the inserted expansion units can be a data storage device, or a modem, or an optical-disk drive device, etc. The expansion apparatus further includes an optical-disk playing system. When one of the inserted expansion units is an optical-disk drive device, the optical-disk playing system can be directly broadcast on an optical-disk placed within the optical-disk playing device, regardless of whether the expansion apparatus is connected to the portable computer.

21 Claims, 4 Drawing Sheets

EXPANSION APPARATUS FOR A PORTABLE COMPUTER

FIELD OF INVENTION

Figure 1A:
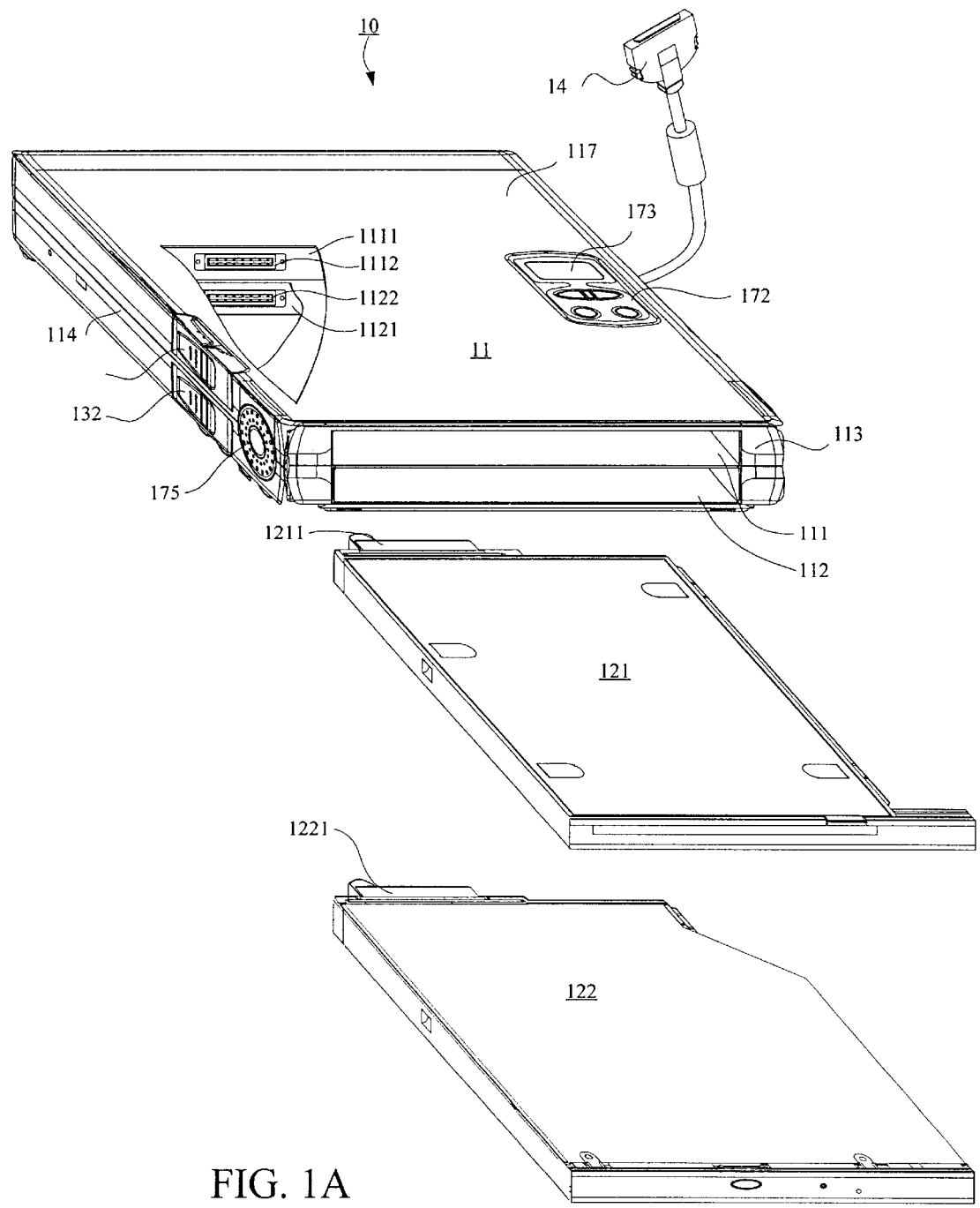

The present invention relates to an external expansion apparatus for a portable computer. In particular, the expansion apparatus accommodates different types of detachable and modulated expansion units that provide the portable computer with expansion functions. Thus, users are given many choices and considerable convenience.

Please refer to the following for information on the related prior patents: U.S. Pat. No. 5,107,400; U.S. Pat. No. 5,126,954; U.S. Pat. No. 5,159,533; U.S. Pat. No. 5,175,671; U.S. Pat. No. 5,323,291; U.S. Pat. No. 5,394,552; U.S. Pat. No. 5,526,493; and U.S. Pat. No. 5,864,294.

BACKGROUND OF INVENTION

The current design for portable computers, such as the notebook computer, gravitate towards the compact and light-weight in order to increase portability. However, due to reasons of size, volume, thickness and weight, for a compact and light portable computer to perform the same functions as a desktop PC or an all-in-one notebook computer, it inevitably requires the assistance of an expansion apparatus to expand its functions.

The three major methods of expanding the functional ability of portable computers may be expressed as the following: (1) the portable computer thereof includes an expansion notch where the expansion apparatus may be connected, thereby increasing the functional ability of the portable computer; (2) the expansion apparatus is made into a docking station where the portable computer may be docked, thereby increasing the functional ability of the portable computer; (3) the expansion apparatus is made to be external, and connects to the portable computer via a connection device (such as a cable), thereby increasing the functional ability of the portable computer.

Present-day PC peripherals, such as data storage means (floppy-disk drive device (FDD), hard-disk drive device (HDD), magneto-optical-disk drive device, Zip-disk drive device, etc), optical-disk drive device (CD-ROM, DVD-ROM, CD-RW, DVD-RAM, etc.) and modems, etc., are nearly all able to form the external expansion apparatus defined by method 3. Furthermore, the external expansion apparatus defined by method 3 eliminates the need for specialized connection devices when connecting to the portable computer, and thus more convenient. Therefore, method 3 is seen to be more adept at providing the user with convenience and multiple choices.

However, the expansion units included in present-day expansion apparatus for portable computers, e.g., the peripherals desiring expansion (such as FDD, HDD, etc.), are all fastened in the interior of the expansion apparatus. If the user wishes to expand a plurality of expansion units of different types for a portable computer, he would need to externally connect a plurality of expansion apparatuses containing different expansion units with the portable computer. Clearly, the means costs very much. In practical applications, if a portable computer is to simultaneously connect to a plurality of different types of expansion units as mentioned above, the inter-connection processes will be complicated and tedious. Consequently, there still exists limitations on the choice and convenience in the current field of external expansion apparatus for portable computers.

Accordingly, the invention intends to provide an external expansion apparatus for portable computers. In particular, each expansion unit included in the expansion apparatus forms a module, and may be inserted into one of the accommodating rooms of the expansion apparatus at will. As a result, the expansion functions provided to the portable computer by the expansion apparatus will depend on the expansion units inserted by the user. Hence, the user receives more choices and a great degree of convenience with the expansion apparatus according to the invention.

Moreover, current multimedia computers provide users with the option of broadcasting optical-disks while the computers are in use. Yet this option has not extended to external expansion apparatuses for portable computers. Accordingly, another objective of the invention is to provide an external apparatus for portable computers. In particular, the expansion apparatus includes an optical-disk playing system. When one of the expansion units accommodated by the expansion apparatus is an optical-disk drive device, the expansion apparatus can be directly broadcast on an optical-disk placed within the optical-disk drive device, regardless of whether the expansion apparatus is connected to the portable computer.

SUMMARY OF INVENTION

An external expansion apparatus for a portable computers is disclosed in the invention. The functions provided to the portable computer by the external expansion apparatus depends on the needs of the user. As a result, the expansion apparatus of the invention gives users many choices and great convenience.

The external expansion apparatus includes at least one accommodating rooms. Each of the at least one rooms can accommodate one of detachable expansion units of different types. Each of the expansion units is formed a module such that it may be inserted into one of the accommodating rooms at will. Users may insert a plurality of expansion units of different types into the expansion apparatus according to their needs, thereby achieving the desired expansion functions.

Another objective of the invention is to provide an external apparatus for a portable computer. In particular, the expansion apparatus includes an optical-disk playing system. When one of the expansion units accommodated by the expansion apparatus is an optical-disk drive device, the expansion apparatus can be directly broadcast on an optical-disk placed within the optical-disk drive device, regardless of whether the expansion apparatus is connected to the portable computer.

The advantage and spirit of the invention may be understood by the following recitations together with the appended drawings.

BRIEF DESCRIPTION OF THE APPENDED DRAWINGS

FIG. 1A illustrates an expansion apparatus 10 according to a preferred embodiment of the invention. The drawing shows the perspective view of the expansion apparatus 10.

Figure 1B:
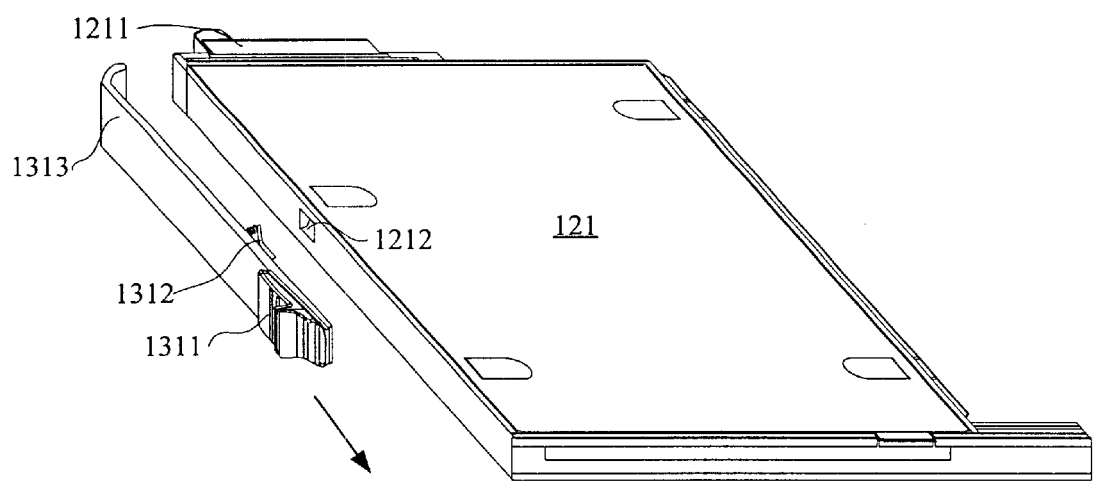

FIG. 1B illustrates an embodiment of the fastening/ejecting means 131 of the expansion apparatus 10 shown in FIG. 1A, and shows how to eject the expansion unit 121.

Figure 1C:
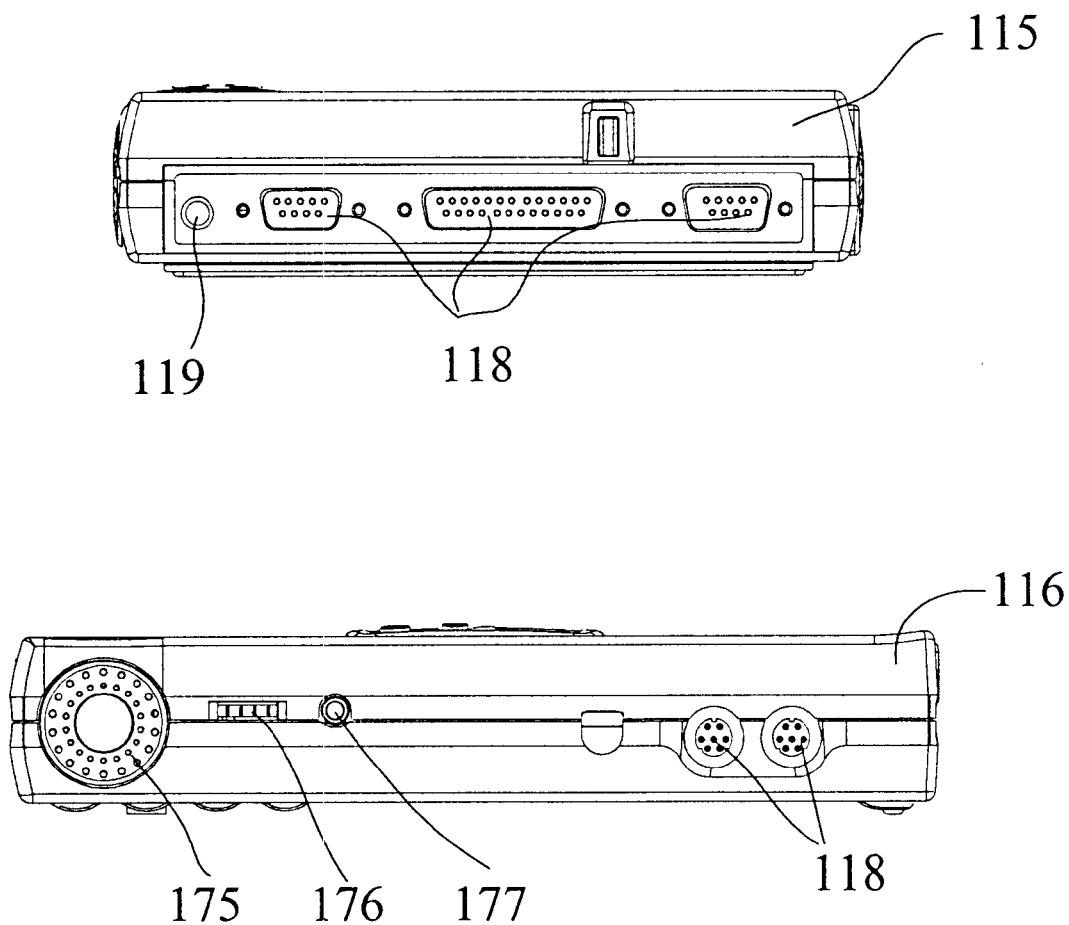

FIG. 1C is the frontal view of the backboard 115 and second sideboard 116 of the expansion apparatus 10 shown in FIG. 1A.

Figure 2:
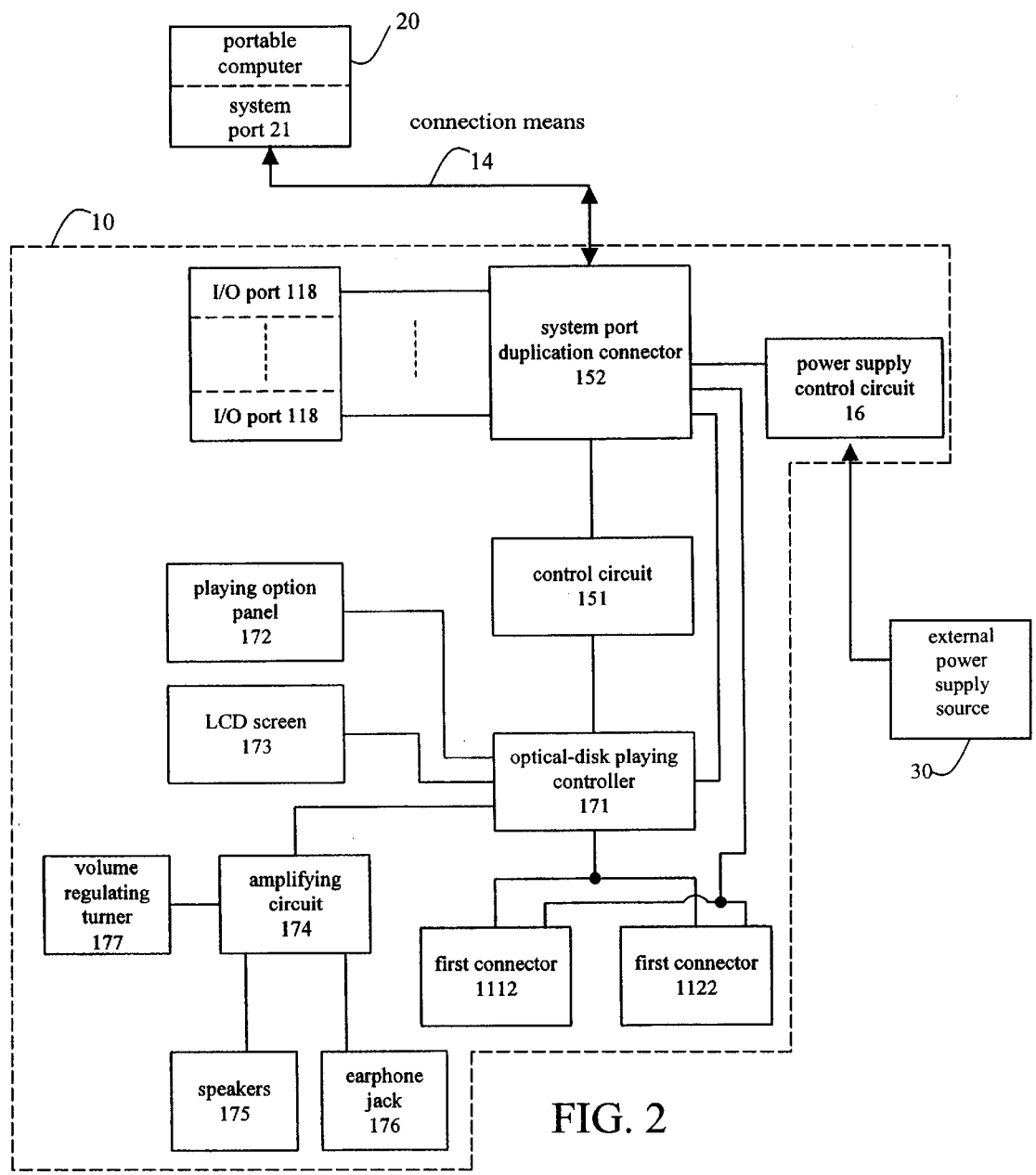

FIG. 2 shows the arrangement of internal electrical circuits of the expansion apparatus 10 according to the invention.

DETAILED DESCRIPTION OF THE INVENTION

The present invention is to provide an external expansion apparatus for a portable computer. One of characteristics of the expansion apparatus is that the expansion apparatus includes one or more accommodating rooms. Each of one or more accommodating rooms could accommodate one of a plurality of detachable expansion units. Also, each of the plurality of expansion units is formed a module, thus is capable of being inserted into any accommodating room of the expansion apparatus at will. Users may insert several expansion units of different types into the expansion apparatus according to their needs, thereby achieving the desired expansion functions. For example, the user, if he so wishes, may insert into the expansion apparatus a floppy-disk drive device, a hard-disk drive device and an optical-disk drive device to provide the portable computer connected to the expansion apparatus with the functions of the expansion unit accommodated in the expansion apparatus. The user may also insert into the expansion apparatus several hard-disk drive devices to provide the portable computer connected to the expansion apparatus the data storage function of several hard-disks.

The following further explains the basic structure of the disclosed expansion apparatus, the many choices it provides to the expansion unit, and the conveniences it provides to the user.

Referring to FIG. 1A, an expansion apparatus 10 according to a preferred embodiment of the invention is disclosed. FIG. 1A shows the perspective view of the expansion apparatus 10. The expansion apparatus 10 is detachably connected to the system port a portable computer (not shown in the drawing) via a connection means 14 (such as cable). When the expansion apparatus 10 is connected to the portable computer, the expansion apparatus 10 can expand the functions of the portable computer. The expansion apparatus 10 includes a box body 11 that has one or more accommodating rooms. The box body 11 is depicted in FIG. 1A as having two accommodating rooms (111 and 112) solely for the purpose of explanation. The box body 11 defines a front-board 113, a first sideboard 114, a backboard 115, a second sideboard 116 and a top-board 117. Each of the two accommodating rooms (111 and 112) defines a back side wall (1111 and 1121, respectively). Each of the two back side walls (1111 and 1121) is provide with a first connector (1112 and 1122, respectively). Each of the two accommodating rooms is used to accommodate one of a plurality of detachable expansion units formed a module. Each the front-board 113 of the two accommodating rooms (111 and 112) has an opening, respectively, that acts as an entrance/exit for the expansion unit to be accommodated. As shown in FIG. 1A, an expansion unit 121 is a floppy-disk drive device that can be inserted into the accommodating room 111 or the accommodating room 112. Also shown in FIG. 1A, an expansion unit 122 is an optical-disk drive device that can be inserted into the accommodating room 111 or the accommodating room 112. The functions (as mentioned above) attributed to the expansion units (121 and 122) are for explanation purposes only. They may alternatively be a floppy-disk drive device, or a hard-disk drive device, or a magneto-optical-disk drive device, or a Zip-disk drive device, or an optical-disk drive device, or a modem, which has the functions the user wishes to expand. The type of peripherals accommodated by the expansion apparatus 10 are determined by the BIOS of the connected portable computer.

All expansion units in the invention, regardless of type, is formed a module, and include a second connector that can be connected to the first connector. Referring to FIG. 1A, there is a second connector 1211 set at the back end of the expansion unit 121 and a second connector 1221 set at the back end of the expansion unit 122. When the expansion units (121 and 122) are separately inserted into the accommodating rooms (111 and 112), the second connectors (1211 and 1221) separately connect to the first connectors (1112 and 1122). After the second connectors (1211 and 1221) of the expansion units (121 and 122) connect to the first connectors (1112 and 1122) of the accommodating rooms (111 and 121), and the expansion apparatus 10 connects to the portable computer, the expansion apparatus 10 provides the portable computer with the functions of the expansion units (121 and 122) when in operation.

In order to fasten expansion units in accommodating rooms and facilitate the ejection of expansion units from accommodating rooms, the expansion apparatus 10 further includes one or more fastening/ejecting means. Each fastening/ejecting means of the one or more fastening/ejecting means corresponds to one of the accommodating rooms such that the expansion units accommodated by the corresponding accommodating rooms may be fastened in/ejected from the accommodating rooms. For clarity of explanation, only two fastening/ejecting means (131 and 132) corresponding to the two accommodating rooms (111 and 112) are depicted in FIG. 1A.

Referring to FIG. 1B, an embodiment of the fastening/ejecting means 131 is shown. The fastening/ejecting means 131 includes an operating structure 1311, an resilient structure 1312 and an ejecting structure 1313. The operating structure 1311 is able to slide around on the surface of the sideboard 114 of the expansion apparatus 10, onto which it is attached. The operating structure 1311 lets the user operate to eject the expansion unit 121. The extrusion of the resilient structure 1312 penetrates a side wall of the accommodating room 111. When the expansion unit 121 is inserted into the accommodating room 111, the extrusion of the elastic structure 1312 is inlaid into a notch 1212 of the expansion unit 121, thus fastening the expansion unit 121 in the accommodating room 111. The elastic structure 1312 includes a spring to support the extrusion in its elastic motions. The ejecting structure 1313 is formed as a curved member, one of its ends butts against the back end of the inserted expansion unit 121. The elastic structure 1312 and ejecting structure 1313 are connected to the operating structure 1311. As the operating structure 1311 slides around, the elastic structure 1312 and ejecting structure 1313 move with the operating structure 1311. To eject the expansion unit 121 from the accommodating room 111, the operating structure 1311 may be operated, resulting in the extrusion of the elastic structure 1312 being ejected from the notch of the expansion unit 121 due to the side wall of the accommodating room 111 pushing against it. Subsequently, the expansion unit 121 is thrust out of the accommodating room 111 by the ejecting structure 1313.

The expansion apparatus 10 according to the invention further includes a communication control circuit 15, which is installed within the expansion apparatus 10, but not shown in FIG. 1A. It is detailed in the following text and FIG. 2. The communication control circuit 15 is electrically connected to the connection means 14 and first connector (1112 and 1122) of each of the accommodating rooms (111 and 112). When the expansion apparatus 10 is connected to the portable computer and in operation, the communication control circuit 15 controls the communication between the portable computer and the expansion units (121 and 122) accommodated in the accommodating rooms (111 and 112).

The expansion apparatus 10 according to by the invention further includes a power supply control circuit 16, which is installed within the expansion apparatus 10, but not shown in FIG. 1A. It is detailed in the following text and FIG. 2. When the expansion apparatus 10 is connected to the portable computer and in operation, the power supply control circuit 16 reacts to the connection of an external power supply source (not shown in FIG. 1) to the expansion apparatus 10, and switches a power supply source of the expansion apparatus to the external Power supply source.

Referring to FIG. 1C, to increase the expansion ability of the expansion apparatus 10, the following is provided: a plurality of input/output ports 118 electrically connected to the communication control circuit 15; a socket 119 that can connect to an external power supply source. The above provisions are located at the backboard 115 and second side board 116 of the box body 11 of the expansion apparatus 10, and facilitate the connection of the portable computer to downstream peripherals. To connect the communication between the downstream peripherals connected to the input/output ports 118 and the portable computer, the forwarding functions of the communication control circuit 15 is needed.

Referring to FIG. 1A and FIG. 1C, the expansion apparatus 10 according to the invention further includes an optical-disk playing system 17. When one of the expansion units (121 or 122) accommodated in the two accommodating rooms (111 and 112) is an optical-disk drive device, the optical-disk playing system 17 can directly broadcast the optical-disk placed within the optical-disk drive device without using the system resources of the portable computer. The optical-disk playing system 17 is electrically connected to the communication control circuit 15, and includes an optical-disk playing controller 171 (not shown in FIG. 1A), a playing option panel 172 that is placed on the top board 117, a LCD screen 173 that is placed on the top board 117, an amplifying circuit 174, speakers 175, an earphone jack 176 and a volume adjusting turner 177. As described above, the expansion apparatus 10 according to the invention can connect to an external power supply source. In coordination with the optical-disk playing system 17, the expansion apparatus 10 can broadcast optical-disks without connecting to the portable computer. When the expansion apparatus 10 is connected to the portable computer the optical-disk playing controller 171 can respond to the request of the portable computer and halt the broadcast. The structure of the optical-disk playing controller 171 is detailed in the following text and FIG. 2 in conjunction with the communication control circuit 15 and power supply control circuit 16.

FIG. 2 illustrates the communication control circuit 15, power supply control circuit 16 and optical-disk playing system 17 of the expansion apparatus 10 according to the invention. Referring to FIG. 2, the communication control circuit 15 includes a system port duplication connector 152 that is connected to the connection means 14, used in duplicate the system 21 port of the portable computer 20 it is connected to. The communication control circuit 15 further includes a control circuit 151, used to control communication,. The plurality of input/output ports 118 are separately electrically connected to the system port duplication connector 152. The power supply control circuit 16 is electrically connected to the system port duplication connector 152 in order to connect with a power supply source of the portable computer 20. The power supply control circuit 16 may be further connected to an external power supply source 30. The optical-disk playing controller 171 of the optical-disk playing system 17 is connected to the control circuit 151, and is also electrically connected to the system port duplication connector 152 via a bus to receive requests from the portable computer 20. The first connectors (1112 and 1122) are electrically connected to the communication control circuit 15 via the optical-disk playing controller 171. The playing option panel 172 and LCD screen 173 of the optical-disk playing system 17 are separately electrically connected to the optical-disk playing controller 171, and are used to transmit the broadcasting request and display the broadcasting situation. When the broadcasting request is given, the optical-disk playing system 17 can determine whether the connected expansion unit is an optical-disk drive device, and can also transmit the information recorded in the broadcast optical-disk back to the LCD screen 173. When more than one optical-disk drive devices are connected to the optical-disk playing system 17, the optical-disk playing system 17 can respond to requests from the playing option panel 172 to switch to the next optical disk drive device. The speakers 175, ear phone jack 176 and volume adjusting turner 177 are separately electrically connected to the amplifying circuit 174, which is then electrically connected to the optical-disk playing controller 171 to process the output from the optical-disk playing controller 171.

In one embodiment, the connection means 14 includes an IDE bus, a floppy-disk drive bus and a power bus. The first connectors (1112 and 1122) and the second connectors (1211 and 1221) each includes an IDE bus and a floppy-disk drive bus. In this case, an expansion unit formed a module can be a floppy-disk drive device or an accessory device with IDE interface.

In another embodiment, the connection means 14 includes a SCSI bus, a floppy-disk drive bus and a power bus. The first connectors (1112 and 1122) and the second connectors (1211 and 1221) each includes a SCSI bus and a floppy-disk drive device. In this case, an expansion unit formed a module can be a floppy-disk drive device or an accessory device with SCSI interface.

The above description is of exemplary and preferred implementations of the invention, such are merely illustrative of the invention and should not be construed as limiting the scope of the invention. Rather, principles of the invention may be exploited within a wide range of implementations for a wide range of applications.

What is claimed is:

1. An expansion apparatus comprising:
   a connection means for connecting to a portable computer;
   a box body for accommodating expansion units each formed as a module;
   a communication control circuit for controlling communications between the portable computer and the expansion units ; and
   a power supply control circuit for selectively establishing an electrical connection between said expansion apparatus and a power source selected from the group consisting of an external power supply source and said portable computer through said connecting means, whereby power required for operation is supplied to said expansion apparatus and the portable computer is provided with expansion functions of the expansion units.

2. The expansion apparatus of claim 1, wherein the box body includes a plurality of accommodating rooms, each serving to accommodate one of the expansion units.

3. The expansion apparatus of claim 2, wherein each of the accommodating rooms has an opening as an entrance/exit for a corresponding one of the expansion units.

4. The expansion apparatus of claim 2 or 3, wherein each of the accommodating rooms is provided with a first connector, and each of the expansion units has a second connector for connecting to a corresponding one of the first connectors while the corresponding accommodating room is accommodating an associated one of the expansion units.

5. The expansion apparatus of claim 4, further comprising a plurality of fastening/ejecting means, each of the fastening/ejecting means corresponding to one of the accommodating rooms for fastening the expansion unit in the corresponding accommodating room or ejecting the expansion unit out of the corresponding accommodating room.

6. The expansion apparatus of claim 1, further comprising a plurality of input/output ports, electrically connected to the communication control circuit, for providing connection with downstream peripherals.

7. The expansion apparatus of claim 1, wherein the different types of expansion units are selected form the group consisting of a data storage means, a modem and a optical-disk drive device.

8. The expansion apparatus of claim 7, wherein the data storage means is selected from the group consisting of a floppy-disk drive device, a hard-disk drive device, a magneto-optical-disk drive device and a Zip-disk drive device.

9. The expansion apparatus of claim 7, further comprising an optical-disk playing system electrically connected to the communication control circuit for directly playing an optical-disk placed within the optical-disk drive device when the optical-disk drive device is accommodated to one of the accommodating rooms.

10. An expansion apparatus comprising:
   a connection means for detachably connecting to a portable computer;
   a plurality of different expansion units;
   a box body for accommodating at least one of the expansion units; and
   a communication control circuit for controlling communication between the portable computer and the expansion units; and
   a power supply control circuit for selectively controlling connection by selectively establishing an electrical connection between said expansion apparatus and a power source selected from the group consisting of an external power supply source and said portable computer through said connection means, whereby power required for operation is supplied to said expansion apparatus and the portable computer is provided with expansion functions of the expansion units;
   whereby when the expansion apparatus is connected to the portable computer, the expansion apparatus provides the portable computer with expansion functions of the expansion units.

11. The expansion apparatus of claim 10, wherein the box body includes a plurality of accommodating rooms for individually accommodating one of the expansion units.

12. The expansion apparatus of claim 11, wherein each of the accommodating rooms has an opening as an entrance/exit for a corresponding one of the expansion units.

13. The expansion apparatus of claim 11 or 12, wherein each of the accommodating rooms has a first connector, and each of the expansion units has a second connector for connecting to a corresponding one of the first connectors while the corresponding accommodating room is accommodating an associated one of the expansion units.

14. The expansion apparatus of claim 13, further comprising a plurality of fastening/ejecting means, each of fascinating/ejecting means corresponding to one of the accommodating rooms for fastening the expansion unit in the corresponding accommodating room or ejecting the expansion unit out of the corresponding accommodating room.

15. The expansion apparatus of claim 10, further comprising a plurality of input/output ports, electrically connected to the communication control circuit, for providing connection with downstream peripherals.

16. The expansion apparatus of claim 10, wherein the expansion units are each one selected from the group consisting of a data storage means, a modem and a optical-disk drive device.

17. The expansion apparatus of claim 16, wherein the data storage means is one selected from the group consisting of a floppy-disk drive device, a hard-disk drive device, a magneto-optical-disk drive device and a Zip-disk drive device.

18. The expansion apparatus of claim 16, further comprising an optical-disk playing circuit electrically connected to the communication control circuit for directly playing an optical-disk placed within the optical-disk drive device if the optical-disk drive device is provided with one of the accommodating rooms.

19. An expansion apparatus for accommodating different types of expansion units each formed as a module with a first connector, being connected to a portable computer for providing the portable computer with expansion functions of the expansion units, the expansion apparatus comprising:
   means for connecting to the portable computer;
   a box body including a plurality of accommodating rooms each with a second connector which becomes electrically connected to the first connector when one of the expansion units is accommodated in one of said plurality of accommodating rooms;
   a control circuit for controlling communications between the portable computer and the expansion units; and
   a power supply control circuit for selectively connecting electrically to a power source selected from the group of consisting of specified external power supply sources and the portable computer to obtain power supply needed in operation.

20. The expansion apparatus of claim 19, further comprising a plurality of input/output ports electrically connected to the control circuit for providing connection to downstream peripherals.

21. An expansion apparatus for accommodating different types of expansion units each formed as a module with a first connector, being connected to a portable computer for providing the portable computer with expansion functions of the expansion units, the expansion apparatus comprising:
   means for connecting to the portable computer;
   a box body including an accompanying room with a second connector which becomes electrically connected to the first connector when one of the expansion units is accommodated in said box body;
   a control circuit for controlling communications between the portable computer and the expansion units; and
   an optical-disk playing circuit electrically connected to the control circuit, for directly playing an optical-disk placed within an optical-disk drive device when the optical-disk drive device is accommodated to the accommodating room.

* * * * *